US008720967B2

(12) United States Patent  
Willey

(10) Patent No.: US 8,720,967 B2  
(45) Date of Patent: May 13, 2014

(54) MANUAL WINDSHIELD ADJUSTING SYSTEM

(71) Applicant: Barry Alan Willey, Inverness, IL (US)

(72) Inventor: Barry Alan Willey, Inverness, IL (US)

(73) Assignee: National Cycle, Inc., Maywood, IL (US)

( * ) Notice: Subject to any disclaimer, the term of this patent is extended or adjusted under 35 U.S.C. 154(b) by 0 days.

(21) Appl. No.: 13/624,535

(22) Filed: Sep. 21, 2012

(65) Prior Publication Data

US 2014/0084619 A1    Mar. 27, 2014

(51) Int. Cl.
*B62J 17/04*    (2006.01)

(52) U.S. Cl.
USPC ......... 296/78.1; 296/92; 296/96.2; 296/96.21

(58) Field of Classification Search
USPC .............................. 296/78.1, 92, 96.2, 96.21
See application file for complete search history.

(56) References Cited

U.S. PATENT DOCUMENTS 4,606,571 A * 8/1986 Fujita .............................. 296/89

* cited by examiner

*Primary Examiner* — Dennis H Pedder
*Assistant Examiner* — Beverly Becker
(74) *Attorney, Agent, or Firm* — Vedder Price P.C.

(57) ABSTRACT

A windshield adjusting system for adjusting a windshield of a vehicle includes a rail adapted for connection to the vehicle and a bracket connected to the windshield. The rail includes a position profile and the bracket includes an alignment portion and a latch with a lock profile that is configured to selectively engage the complementary position profile to secure the windshield in a desired position.

18 Claims, 5 Drawing Sheets

MANUAL WINDSHIELD ADJUSTING SYSTEM

BACKGROUND

Windshields are often provided or added to vehicles such as scooters, motorcycles, or the like to shield the operator from wind, debris, or other elements while the vehicle is in motion. A desired position of a windshield, however, may vary between operators because of differing sizes of operators, differing positions, differing preferences, etc. Further still, an operator may want to vary the position of a windshield between or during rides on the vehicle because of different needs or varying conditions.

Windshield adjustment mechanisms have been traditionally created as a linkage of members often coupled to a motor. Therefore, a more simple assembly is needed that can be manually adjusted without the need for tools or specialized knowledge.

SUMMARY

A windshield adjusting system for adjusting a windshield of a vehicle may include a rail adapted for connection to the vehicle and a bracket connected to the windshield. The rail may include a position profile and the bracket may include an alignment portion and a latch with a lock profile that may be configured to selectively engage the complementary position profile to secure the windshield in a desired position.

The rail of the windshield adjusting system may also include a guide profile whereby the alignment portion defines a passageway configured to receive the rail and the passageway is complementary to the guide profile.

BRIEF DESCRIPTION OF THE DRAWINGS

The following disclosure as a whole may be best understood by reference to the provided detailed description when read in conjunction with the accompanying drawings, drawing description, abstract, background, and associated headings. Identical reference numerals when found on different figures identify the same elements or a functionally equivalent element.

DETAILED DESCRIPTION

The present disclosure is not limited to the particular details of the apparatus, assembly, systems or methods depicted, and other modifications and applications may be contemplated. Further changes may be made to the apparatus, assembly, systems or methods without departing from the true spirit of the scope of the disclosure herein involved. It is intended, therefore, that the subject matter in this disclosure should be interpreted as illustrative, not in a limiting sense.

The windshield adjusting system of the present disclosure may be used in a number of environments and on any number of vehicles. Some example vehicles on which the windshield adjusting system can used include scooters, motorcycles, all-terrain vehicles, quads, snowmobiles, two-wheelers, three-wheelers and the like. The system, however, can be used on almost any vehicle that could benefit from an adjustable windshield as described herein.

Figure 1:
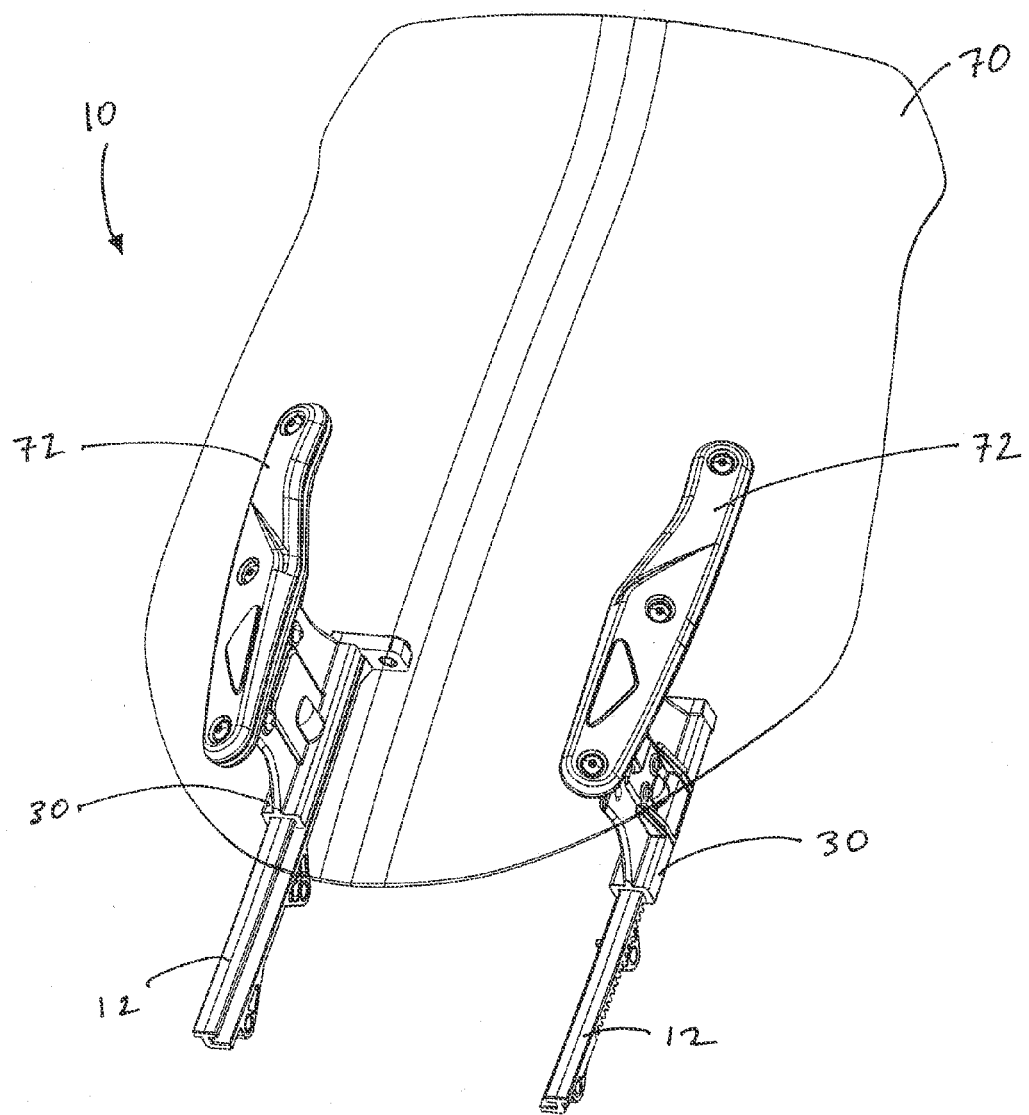
FIG. 1 is a perspective view of one example of the windshield adjusting system as assembled with a windshield.
Figure 2:
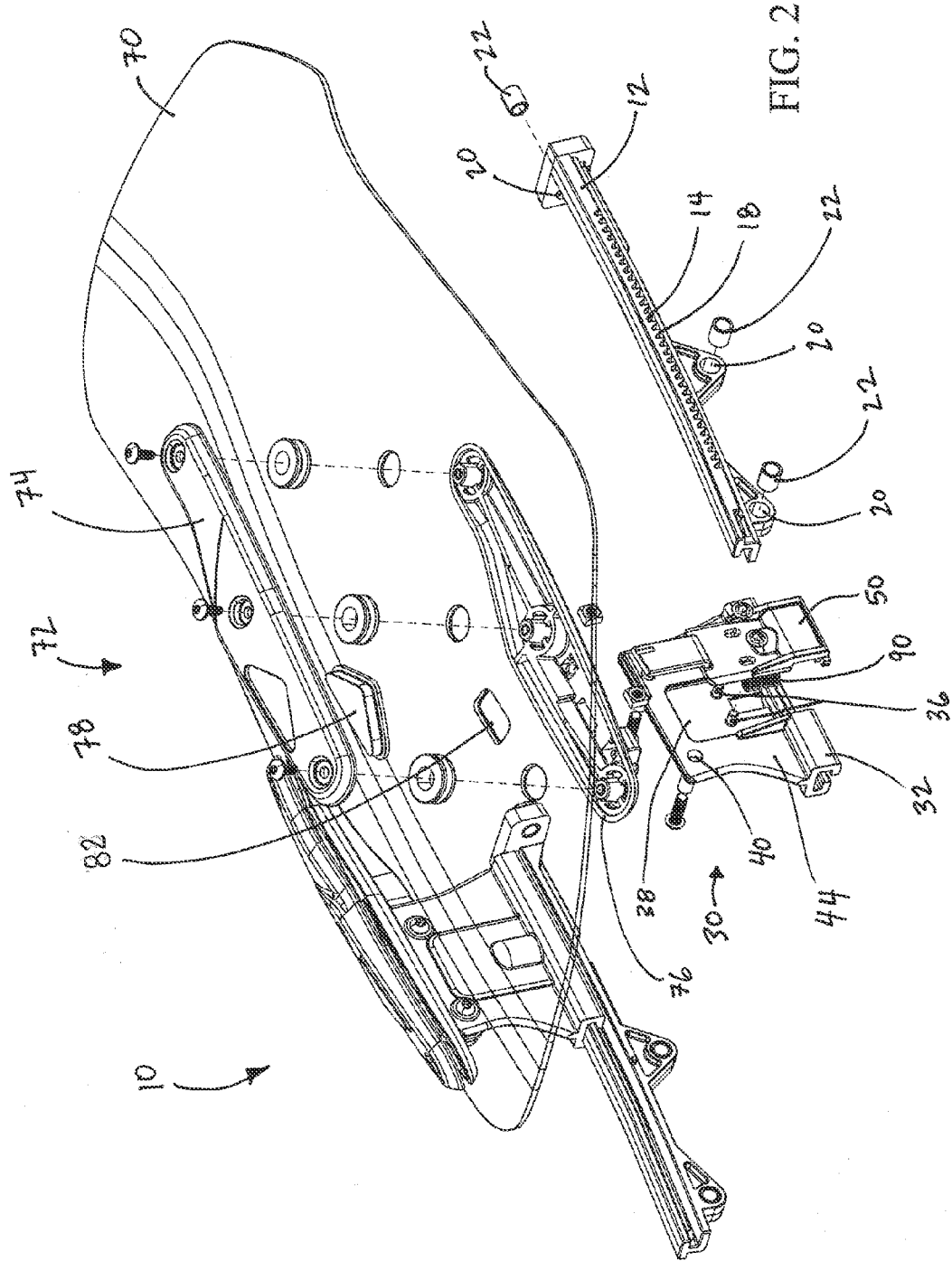
FIG. 2 is an exploded view of an example of the windshield adjusting system of the present disclosure.

As shown in FIGS. 1 and 2, one example of windshield adjustment system 10 may include a rail 12, bracket 30, and mount 72 that can be used to secure windshield 70 to a vehicle of almost any type as previously described. Rail 12 can be secured to a vehicle and allows for bracket 30 to be movably positioned on rail 12 at multiple positions along its length. Mount 72 is secured to windshield 70 and is also connected to bracket 30. This configuration of windshield adjustment system 10 allows for the adjustment of windshield 70 as bracket 30 is movably positioned along the length of rail 12.

Rail 12, bracket 30, and mount 72, in this example, may be injection molded plastic parts that are made from a suitable plastic material with the characteristics necessary to withstand the forces and environment that it will be subjected to when used on a vehicle in a variety of environmental conditions. One example material is acrylonitrile butadiene styrene (ABS) thermoplastic. Other materials, such as but not limited to, nylon (PA6/6 GF12), other plastics, composites, metals, alloys and combinations thereof can be used, however, as are known to one of ordinary skill in the art.

FIG. 2 illustrates the details of one embodiment of rail 12 as shown. Rail 12 may include a position profile 14, guide profile 16, series of rail notches 18, attachment points 20, and attachment bushing 22. Attachment points 20 are positioned at various locations along rail 12 in order to secure rail 12 to the vehicle. As shown, attachment points 20 are located at predetermined locations on rail 12 so as to facilitate the attachment of rail 12 to a known vehicle. Different vehicles may have different attachment locations or classes or models or makes of vehicles may have standardized locations of attachment. Rail 12 and attachment points 20 can be configured to interact with these standardized locations of attachment. Attachment points 20 can also be provided as slots or with a variety of attachment points at different locations such that rail 12 can be used with a variety of vehicles having different locations for attachment. Rail 12 may also have attachment bushings 22 that can be inserted into attachment points 20. Attachment bushings 22 can isolate vibration and other forces from the vehicle so as to prolong the life of windshield adjustment system 10 and windshield 70. Attachment bushings 22 may also be provided such that attachment points 20 can interact with a variety of fastener types and sizes that are needed to secure rail 12 to a variety of vehicles.

In one embodiment, rail 12 may include position profile 14. Position profile 14 is the configuration of rail 12 that allows for the positioning and locking of bracket 30 along the length of rail 12. Position profile 14 can be a variety of shapes and/or configurations that enables a windshield secured to windshield adjustment system 10 to be moved and positioned relative to a vehicle. Position profile can be configured to allow for the positioning of a windshield both longitudinally and vertically relative to the vehicle. As shown in this example, position profile 14 may be configured to be disposed along a portion of rail 12. Alternatively, position profile may be disposed along the entire length or in other configurations such as in dispersed locations or limited to predetermined locations along rail 12 or the like. Rail 12 may have a curved shape as shown. As can be appreciated, as bracket 30 is positioned at different locations along position profile 14, windshield 70 will be at different locations both longitudinally and vertically with respect to a vehicle. While position profile 14 is shown in combination with a shallow arc of rail 12 in this example, other curves and shapes of rail 12 may be used.

Position profile 14 may also allow for the locking of bracket 30. To facilitate this functionality, in one example, position profile 14 may include a series of rail notches 18 selectably disposed along a length of rail 12. The series of rail notches 18 are configured to interact with a complementary latch profile on latch 50 as described herein. The series of rail notches 18 is provided along the length of rail 12, as described, such that bracket 30 can be positioned and locked at a number of locations along position profile 14 of rail 12. Other rail locking features may be provided in the place of rail notches 18 to provide similar functionality. Other examples of rail locking features may be holes with complementary pins, castellated locking means known to one of ordinary skill in the art, etc. or the like.

Figure 4:
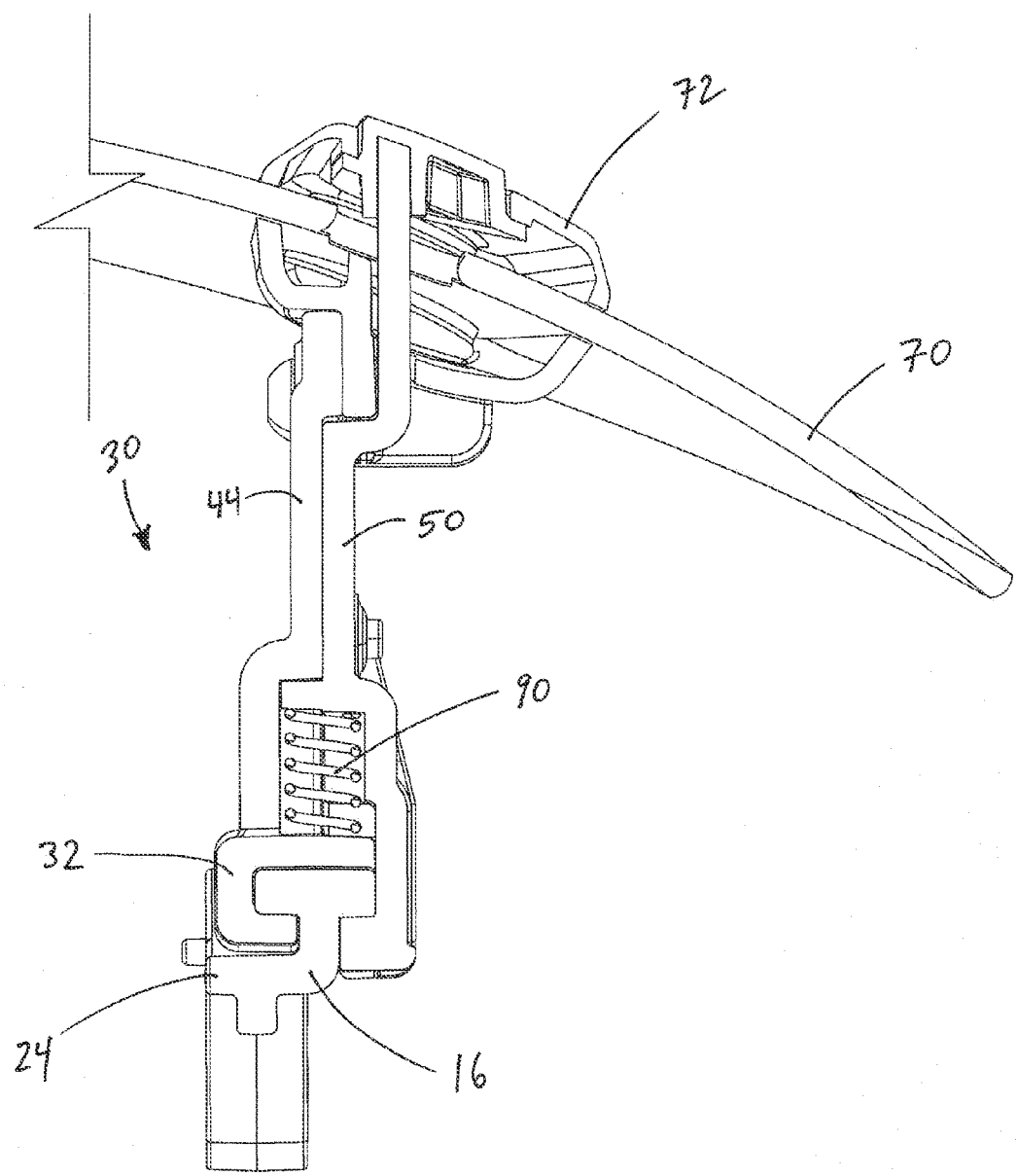
FIG. 4 is a sectional view of the bracket and mount of an example of the windshield adjusting system of the present disclosure.

In one embodiment, and as further shown in more detail in FIG. 4, rail 12 includes guide profile 16. Guide profile 16 is the feature of rail 12 that vertically supports and retains bracket 30 to rail 12. As shown in this example, guide profile 16 is a T-shaped profile. In addition, guide profile 16 includes extension 24. As will be described in more detail, guide profile 16 interacts with alignment portion 32 of bracket 30. Guide profile 16 may also be other shapes and configurations such as, but not limited to, S-shaped, round or circle-shaped, C-shaped, other suitable configurations, etc. or the like.

Figure 3:
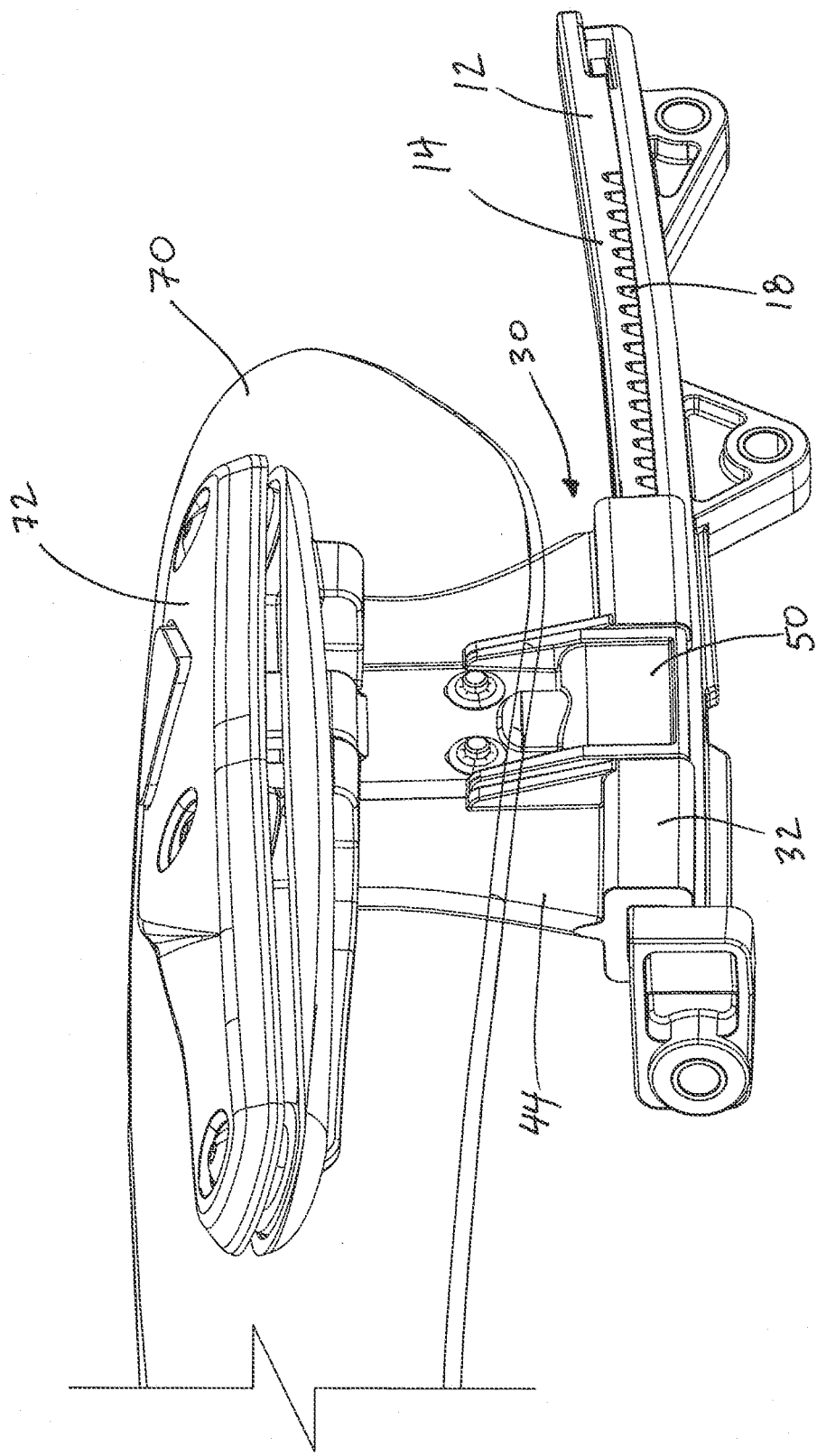
FIG. 3 is another view of an example of the windshield adjusting system of the present disclosure.

Referring further to FIG. 2, windshield adjusting system 10, in this example, also includes bracket 30. Bracket 30, as further shown in FIGS. 3, 5 and 6, includes alignment portion 32, mounting portion 44, biasing element 90 and latch 50. Alignment portion 32 and mounting portion 44, as shown in this example, may be integrally formed as part of the same component while biasing element 90 and latch 50 are shown as separate components. In other embodiments, however, the elements may be separate components and joined together or mated by various techniques known to those of ordinary skill in the art or may equally be integrally formed.

Figure 5:
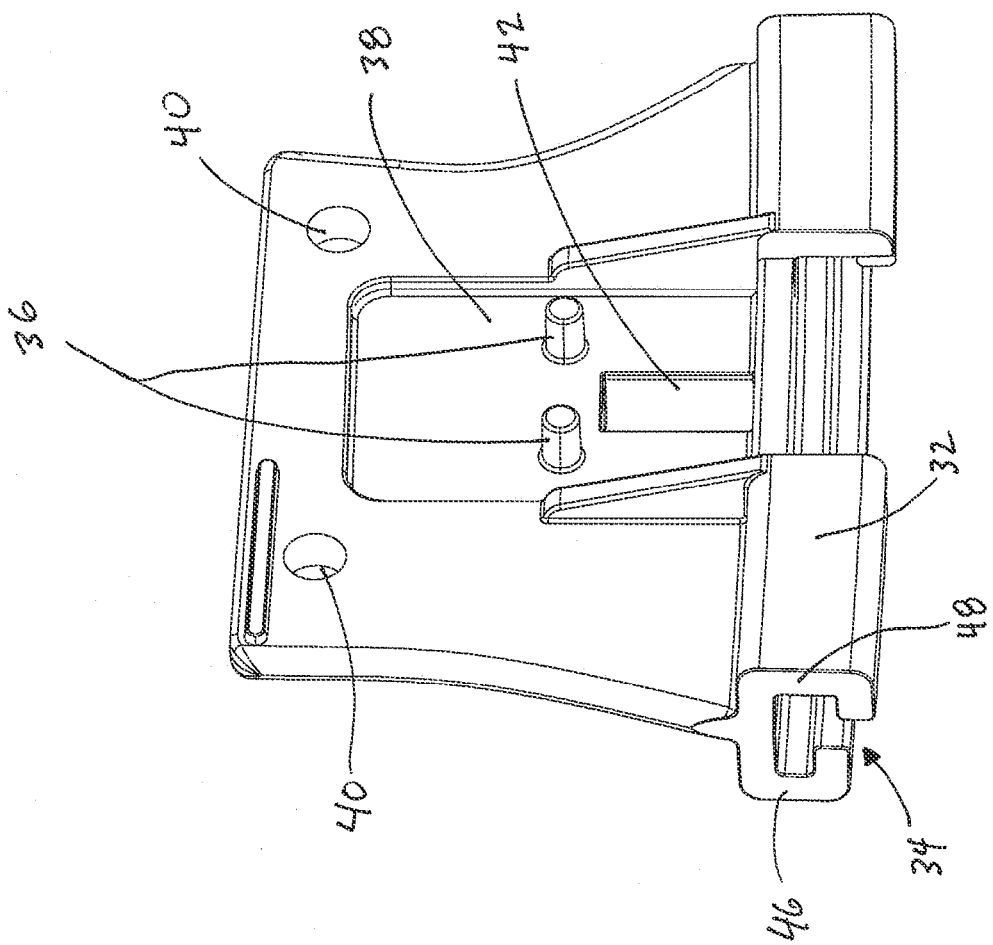
FIG. 5 is a perspective view showing various aspects of one example of the bracket of the windshield adjusting system of the present disclosure.

Alignment portion 32 of bracket 30 interacts with rail 12. As such, the shape of alignment portion 32 is preferably complementary to the position profile 14 and guide profile 16 of rail 12. In this example, alignment portion 32 is a downward-facing C-shaped profile that surrounds a portion of the T-shaped guide profile of rail 12. Alignment portion 32 defines a passageway 34 through which rail 12 may be inserted. Alignment portion 32 may be different shapes suitable to interact with the guide profile 16 of rail 12. Alignment portion 32 may additionally include inner arm 46 and outer arm 48. As shown in FIG. 5 in one embodiment, inner arm 46 is continuous along a length of alignment portion 32. Outer arm 48, in contrast, is not continuous and includes a gap at latch recess 38.

Bracket 30, in one embodiment, may also include mounting portion 44. Mounting portion 44 is a feature of bracket 30 that facilitates the attachment of bracket 30 to mount 72. In this embodiment, mounting portion is a wall that extends vertically from alignment portion 32. Mounting portion 44 includes mounting holes 40 that are configured to receive fasteners for the attachment of mount 72. Mounting portion 44 may also include latch recess 38 that is configured to receive latch 50 that will be discussed in more detail below. Guide pins 36 may also be provided to locate and retain latch 50 within latch recess 38. Alternatively, latch holes and fasteners may be used to locate and retain latch 50 to mounting portion 44.

Bracket 30, in one embodiment, may also include biasing element 90. Biasing element 90 may be a spring as shown in FIG. 2. Any suitable spring may be used such as a traditional coiled compression spring, as is known to those of ordinary skill in the art or the like. Biasing element 90 is the feature of bracket 30 that biases latch 50 into a locking position such that bracket 30 is secured relative to rail 12. Biasing element 90, in this embodiment, may be a compression spring located in pocket 42. Pocket 42 is defined by alignment portion 32 on the bottom and a wall and top of mounting portion 44 located in latch recess 38. A cavity 60 of latch 50 additionally surrounds biasing element 90. Biasing element 90 does not have to be a compression spring. Biasing element 90 may be, for example, a spring-like element integrally molded into bracket 30 or latch 50, a compressible, elastic material like rubber or foam, a chamber of fluid or gas, other suitable embodiments known to one of ordinary skill in the art, etc. or the like.

Figure 6:
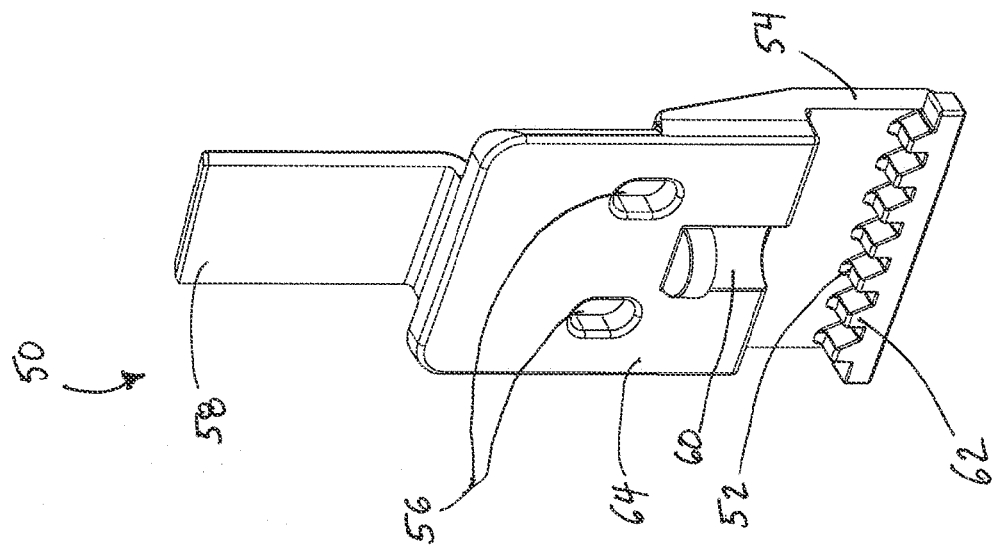
FIG. 6. is a perspective view of one example of the latch of the windshield adjusting system of the present disclosure.

Bracket 30 may also include latch 50. Latch 50 is the element of bracket 30 that enables bracket 30 to be secured relative to rail 12. As shown in FIGS. 2 and 6, in one embodiment, latch 50 may include lock arm 54, main body 64, and actuation arm 58. Lock arra 54 is the portion of latch 50 that engages and interacts with rail 12. As shown in FIG. 4, lock arm 54 can have a profile similar to that of outer arm 48 of bracket 30. The profile of lock arm 54 may surround or engage the guide profile 16 of rail 12. Additionally, as shown on FIG. 6, lock arm may include lock profile 62 that can include a series of latch notches 52 that are complementary to the series of rail notches 18 of rail 12. The interaction of latch notches 52 with rail notches 18 prevents the movement of bracket 30 relative to rail 12 when the two sets of notches are engaged. As stated above, position profile 14 and rail notches 18 may take various other configurations to enable the locking of bracket 30 relative to rail 12. Similarly to the discussion above, latch notches 52 can take other forms in order to make suitable engagement to the position profile of rail 12.

Latch 50 may also include main body 64. Main body 64, in the embodiment shown, includes guide slots 56 that are configured to locate and secure latch 50 to bracket 30. Main body 64 is also configured such that it is of a suitable size so as to fit and be received within latch recess 38 of bracket 30. Main body 64 also includes cavity 60 defined by a boundary wall and top molded into the component. Cavity 60 is configured such that biasing element 90 is received in cavity 60. Further, as latch 50 is moved relative to bracket 30, biasing element 90 resists this movement and returns latch 50 to a locked state when external forces are removed from latch 50. The main body 64 of latch 50 may also be configured in other shapes and sizes known to one of ordinary skill in the art so long as the functionality described herein is preserved.

Latch 50, in this example, also includes actuation arm 58. Actuation arm 58 is the portion of latch 50 that is utilized to change bracket 30 from a locked state into an unlocked state so that bracket 30 can be moved relative to rail 12. Actuation arm 58, in this example, is an extension off of main body 64. Actuation arm 58, when assembled with a windshield as shown in FIGS. 1 and 4, extends through mount 72 and beyond an outer surface of windshield 70. With this configuration, an operator desiring to move a windshield can easily actuate bracket 30 to an unlocked state from the outside of windshield 70 or from in front of the vehicle. Actuation arm 58, in this example, is integrally formed as part of latch 50 but actuation arm 58 could alternatively be a separate piece such as a rod, lever, or button, or other suitable structure.

As shown in FIG. 2, windshield adjusting system 10 may also include mount 72. Mount 72 is the feature of the system that is used to secure the windshield to bracket 30. As shown in this example, mount 72 is a separate piece. Mount 72, alternatively, could be integrally formed as part of bracket 30. Mount 72, in this example, includes upper member 74, lower member 76, and actuation member 78. Upper member 74 and lower member 76 operate to sandwich windshield 70. Fasteners are placed through holes in the upper member and secured to lower member 76 with windshield 70 located between upper member 74 and lower member 76. Mounting bushings 80 may be inserted in the mounting holes of windshield 70 to isolate and distribute the vibrations and forces exerted on windshield 70.

Also shown in FIG. 2, windshield 70 may include actuation aperture 82. Actuation hole 82 allows a user to interact with the actuation arm 58 of latch 50. In this example, actuation arm 58 extends upward through actuation aperture 82 of windshield 70. Mount 72, in one embodiment, includes actuation member 78 in the form of a button that, when pressed, exerts a force on actuation arm 58 and moves latch 50 in order to change bracket 30 to an unlocked position.

As can be appreciated from the foregoing description, the windshield adjusting system 10 of the present disclosure can be configured to be installed on a variety of vehicles. The installation of the windshield adjusting system can be accomplished by securing rail 12 to a vehicle. Mount 72 and bracket 30 are secured to windshield 70. In the embodiment shown in FIG. 2, a user would pick up the windshield, bracket, and mount assembly and press actuation member 78 that, in turn, actuates actuation arm 58 of latch 50. Bracket 30 can then be positioned at a desired position by engaging alignment portion of bracket 30 over rail 12. When the windshield assembly is in a desired position, actuation member 78 is released that, in turn, locks bracket 30 relative to rail 12. Adjustment of the windshield can also be accomplished similarly to the description above with regards to the positioning of bracket 30 in a desired position.

When installed on a vehicle, a windshield equipped with windshield adjusting system 10, in one embodiment, is able to withstand impacts with accelerations of, at least, 8 g. In the embodiment shown in FIG. 2, the force exerted on a windshield is transferred from mount 70 through bracket 30 to rail 12. In this example, biasing element 90 resists movement of the actuation arm 58 of latch 50 in bracket 30. The support of a windshield from wind pressure exerted on the windshield, for example, is substantially resisted by mount 70 through bracket 30 and ultimately to rail 12 that is secured to a vehicle.

As can be appreciated to one of ordinary skill in the art, the installation and adjustment of windshield adjusting system 10 can be accomplished in different sequences according to the needs of the user such as, for example, securing bracket 30 relative to rail 12 prior to securing rail 12 to a vehicle.

In use, the windshield adjusting system 10 can enable a user to easily change the position of a windshield that has been installed on a vehicle. The windshield can be moved in directions both vertically and longitudinally depending on the configuration of the components of windshield adjusting system as previously described. In order to modify the position of a windshield, an operator would, in one embodiment, actuate actuating arm of windshield adjusting system 10. Actuation of actuation arm can be accomplished by pushing down on actuating arm 58, in one embodiment. Other methods of actuation can be used, however, such as pulling on an actuation arm, twisting a locking feature, etc. or the like. Actuation of actuation arm 58, in one embodiment, disengages lock profile 62 from position profile 14.

An operator may then grasp the windshield and move the windshield relative to the vehicle. In one embodiment, as an operator grasps the windshield and moves it, bracket 30 slides along rail 12 to an adjusted or preferred position. The operator may then release the actuation arm. At this point, the windshield has been moved to an adjusted or preferred position. The release of actuation arm 58, in one embodiment, engages lock profile 62 to position profile 14 and secures the windshield in the adjusted position. Adjustment of a windshield using windshield adjustment system 10 can be performed many times over as preferred by an operator. As can be appreciated, an operator may perform an adjustment of a windshield using a windshield adjusting system while seated, from the front of a vehicle, or virtually from any position where the windshield adjusting system can be accessed.

The preceding detailed description is merely some examples and embodiments of the present disclosure and that numerous changes to the disclosed embodiments can be made in accordance with the disclosure herein without departing from its spirit or scope. The preceding description, therefore, is not meant to limit the scope of the disclosure but to provide sufficient disclosure to one of ordinary skill in the art to practice the invention without undue burden.

The invention claimed is:

1. A windshield adjusting system for adjusting a windshield of a vehicle, comprising:
    a rail adapted for connection to the vehicle, the rail including a position profile; and
    a bracket connected to the windshield, the bracket including an alignment portion movably connected to the rail, and a latch movably connected to the bracket, the latch including a lock profile configured to selectively engage the complementary position profile to secure the windshield in a desired position wherein the rail includes a guide profile having a substantially "T"-shaped configuration.

2. The windshield adjusting system as recited in claim 1, wherein, the alignment portion defines a passageway configured to receive the rail, and the passageway is complementary to the guide profile.

3. The windshield adjusting system as recited in claim 1, wherein the position profile includes a series of notches formed on a lower portion of a guide profile of the rail.

4. A windshield adjusting system for adjusting a windshield of a vehicle, comprising:
    a rail adapted for connection to the vehicle, the rail including a position profile; and
    a bracket connected to the windshield, the bracket including an alignment portion movably connected to the rail, and a latch movably connected to the bracket, the latch including a lock profile configured to selectively engage the complementary position profile to secure the windshield in a desired position, wherein the bracket includes a mounting portion that extends from the alignment portion and a latch recess formed in the alignment portion and the mounting portion, the latch recess configured to receive a main body portion of the latch.

5. A windshield adjusting system for adjusting a windshield of a vehicle, comprising:
    a rail adapted for connection to the vehicle, the rail including a position profile; and
    a bracket connected to the windshield, the bracket including an alignment portion movably connected to the rail, and a latch movably connected to the bracket, the latch including a lock profile configured to selectively engage the complementary position profile to secure the windshield in a desired position, wherein the bracket includes a biasing element disposed in a biasing element recess defined by the alignment portion, a mounting portion and the latch.

6. A windshield adjusting system for adjusting a windshield of a vehicle, comprising:
   a rail adapted for connection to the vehicle, the rail including a position profile; and
   a bracket connected to the windshield, the bracket including an alignment portion movably connected to the rail, and a latch movably connected to the bracket, the latch including a lock profile configured to selectively engage the complementary position profile to secure the windshield in a desired position, wherein the alignment portion includes an inner arm that is continuous along its length and an outer arm that is discontinuous along its length to define a portion of a latch recess.

7. A windshield adjusting system for adjusting a windshield of a vehicle, comprising:
   a rail adapted for connection to the vehicle, the rail including a position profile; and
   a bracket connected to the windshield, the bracket including an alignment portion movably connected to the rail, and a latch movably connected to the bracket, the latch including a lock profile configured to selectively engage the complementary position profile to secure the windshield in a desired position, wherein the latch further comprises an actuation arm configured to extend through an actuation aperture in the windshield.

8. A motorcycle including a windshield and a windshield adjusting system, said windshield adjusting system comprising:
   a rail connected to the motorcycle, the rail including a position profile; and
   a bracket connected to the windshield, the bracket including an alignment portion movably connected to the rail, and a latch movably connected to the bracket, the latch including a lock profile configured to selectively engage the complementary position profile to secure the windshield in a desired position wherein the rail includes a guide profile having a substantially "T"-shaped configuration.

9. The vehicle as recited in claim 8, wherein the alignment portion defines a passageway configured to receive the rail, and the passageway is complementary to the guide profile.

10. The vehicle as recited in claim 8, wherein the position profile includes a series of notches formed on a lower portion of a guide profile of the rail.

11. A motorcycle including a windshield and a windshield adjusting system, said windshield adjusting system comprising:
   a rail connected to the motorcycle, the rail including a position profile; and
   a bracket connected to the windshield, the bracket including an alignment portion movably connected to the rail, and a latch movably connected to the bracket, the latch including a lock profile configured to selectively engage the complementary position profile to secure the windshield in a desired position wherein the bracket includes a mounting portion that extends from the alignment portion and a latch recess formed in the alignment portion and the mounting portion, the latch recess configured to receive a main body portion of the latch.

12. A motorcycle including a windshield and a windshield adjusting system, said windshield adjusting system comprising:
   a rail connected to the motorcycle, the rail including a position profile; and
   a bracket connected to the windshield, the bracket including an alignment portion movably connected to the rail, and a latch movably connected to the bracket, the latch including a lock profile configured to selectively engage the complementary position profile to secure the windshield in a desired position, wherein the bracket includes a biasing element disposed in a biasing element recess defined by the alignment portion, a mounting portion and the latch.

13. A motorcycle including a windshield and a windshield adjusting system, said windshield adjusting system comprising:
   a rail connected to the motorcycle, the rail including a position profile; and
   a bracket connected to the windshield, the bracket including an alignment portion movably connected to the rail, and a latch movably connected to the bracket, the latch including a lock profile configured to selectively engage the complementary position profile to secure the windshield in a desired position, wherein the alignment portion includes an inner arm that is continuous along its length and an outer arm that is discontinuous along its length to define a portion of a latch recess.

14. A motorcycle including a windshield and a windshield adjusting system, said windshield adjusting system comprising:
   a rail connected to the motorcycle, the rail including a position profile; and
   a bracket connected to the windshield, the bracket including an alignment portion movably connected to the rail, and a latch movably connected to the bracket, the latch including a lock profile configured to selectively engage the complementary position profile to secure the windshield in a desired position, wherein the latch further comprises an actuation arm configured to extend through an actuation aperture in the windshield.

15. A method of adjusting a windshield, the method comprising:
   grasping the windshield disposed in an initial position;
   actuating an actuation arm of a windshield adjusting system to disengage a lock profile defined on a latch from a position profile defined on a rail;
   moving the windshield relative to a rail connected to the vehicle to an adjusted position; and
   releasing the actuation member to engage the lock profile and the position profile and thereby secure the windshield in the adjusted position.

16. The method as recited in claim 15, wherein the actuation arm of the windshield adjusting system is configured to extend through an actuation aperture in the windshield.

17. A method of installing a windshield adjustment system onto a vehicle, the method comprising:
   attaching a rail to the vehicle, the rail comprising a position profile;
   actuating an actuation arm of a latch of a bracket on the windshield adjusting system;
   positioning the bracket relative to the rail in a desired position by engaging an alignment portion of the bracket to the position profile;
   releasing the actuation arm to engage a lock profile of the latch to the position profile such that the bracket is secured to the rail.

18. The method as recited in claim 17, wherein the actuation arm is configured to extend through an actuation aperture in a windshield.

* * * * *